United States Patent
Sundt et al.

(10) Patent No.: US 7,957,289 B2
(45) Date of Patent: Jun. 7, 2011

(54) METHOD TO REDUCE IGP ROUTING INFORMATION

(75) Inventors: Mark Sundt, Red Bank, NJ (US); James Uttaro, Staten Island, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 98 days.

(21) Appl. No.: 12/283,334

(22) Filed: Sep. 11, 2008

(65) Prior Publication Data
US 2010/0061381 A1    Mar. 11, 2010

(51) Int. Cl.
G01R 31/08 (2006.01)
H04L 12/28 (2006.01)
(52) U.S. Cl. .......... 370/235; 370/401
(58) Field of Classification Search .......... None
See application file for complete search history.

(56) References Cited

U.S. PATENT DOCUMENTS

| | | | |
|---|---|---|---|
| 7,580,417 B2 * | 8/2009 | Ervin et al. | 370/397 |
| 2004/0177157 A1 * | 9/2004 | Mistry et al. | 709/241 |
| 2006/0164975 A1 | 7/2006 | Filsfils et al. | |
| 2007/0208874 A1 | 9/2007 | Previdi et al. | |
| 2007/0223486 A1 | 9/2007 | Farid et al. | |
| 2008/0198849 A1 * | 8/2008 | Guichard et al. | 370/392 |
| 2008/0219277 A1 * | 9/2008 | Pratap et al. | 370/406 |
| 2009/0154373 A1 * | 6/2009 | Ye et al. | 370/253 |
| 2010/0061227 A1 | 3/2010 | Sundt et al. | |

OTHER PUBLICATIONS

United States Patent and Trademark Office, "Non-Final Office Action," issued in connection with U.S. Appl. No. 12/286,478, mailed Mar. 17, 2010, 12 pages.
United States Patent and Trademark Office, "Final Office Action," issued in connection with U.S. Appl. No. 12/286,478, mailed Sep. 2, 2010, 11 pages.
United States Patent and Trademark Office, "Non-Final Office Action," issued in connection with U.S. Appl. No. 12/286,478 on Feb. 25, 2011 (16 pages).

* cited by examiner

*Primary Examiner* — Hong Cho
*Assistant Examiner* — Eunsook Choi
(74) *Attorney, Agent, or Firm* — Hanley, Flight & Zimmerman

(57) ABSTRACT

A system and method for routing traffic from an ingress provider edge router to an egress provider edge router that eliminates the need to share state information between the ingress provider edge router and a plurality of core routers in a core network. The ingress provider edge router and egress provider edge router are each coupled to at least two core routers among the plurality of core routers in the core network, the ingress provider edge router learning routes with a next hop equal to an IP address of the egress provider edge router through an internal border gateway protocol (iBGP). The ingress provider edge router balances traffic flows on uplinks between the ingress provider edge router and the at least two core routers coupled to the ingress provider edge router without knowledge of network topology in the core network.

13 Claims, 3 Drawing Sheets

METHOD TO REDUCE IGP ROUTING INFORMATION

CROSS REFERENCE TO RELATED APPLICATIONS

This application is related to U.S. application Ser. No. 12/286,478, entitled "Method to Reduce Routing Convergence at the Edge," filed Sep. 30, 2008.

FIELD OF THE INVENTION

The present invention relates generally to computer networking, and more particularly, to systems and methods that remove provider edge routers from the Interior Gateway Protocol (IGP) in order to allow massive scaling of IGP routing infrastructures.

BACKGROUND OF THE INVENTION

The use of Computing Devices (CDs) and computer networks are an integral part of personal, corporate and government communication. A computer network is a collection of physically distributed sub-networks, such as local area networks (LANs) that transport data between network nodes. A node may be loosely defined as device adapted to send and/or receive data in the computer network. Therefore, a node may be the source of data to be transported, the destination for data being transported or a location through which data may travel on its way from source to destination.

Network topology is the representation and arrangement of network elements, including links and nodes, and the physical and logical interconnections between nodes. A LAN is an example of a network that exhibits both a physical topology and a logical topology. Any given node in a LAN will have one or more physical links to one or more other nodes in the network typically through one or more intermediate nodes, such as routers and switches, thus defining the physical topology. Likewise, the mapping of the flow of data between the nodes in the network determines the logical topology of the network. The physical and logical topologies might be identical in any particular network, but they also may be different.

Data may be exchanged via intra-network communications, that is within one network, and may also be exchanged between inter-network, that is between neighboring (i.e., adjacent) networks. In that regard, "edge devices" located at the logical outer boundaries of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

FIG. 1 is a schematic of an illustrative prior art Virtual Private Network (VPN) 100, as is well known by those skilled in the art. A VPN is a computer network that is a collection of network nodes that establish private communications over a shared backbone network. VPNs effectively tunnel through another network for security reasons or to separate traffic from various users. Routing devices, generically referred to by their primary purpose, such as customer edge routers, core routers and the like, utilize a defined protocol that specifies how routers will communicate with other routers to receive and send information via selected routes between nodes on a network. The term routing protocol may refer more specifically to a protocol operating at Layer 3 of the OSI model, which distributes network topology information among routers.

Referring to FIG. 1, Customer Edge ($CE_1$ and $CE_2$) routers 102 located at a customer premises, are in turn are connected to Provider Edge ($PE_1$ and $PE_2$) routers 104 of a service provider Internet Protocol/Multiple Protocol Label Switching (IP/MPLS) network. CE routers communicate or peer with the PE routers through a corresponding Virtual Routing and Forwarding (VRF) attachment circuit. The PE router resides between one network service provider's area and areas administered by other network providers.

In Multi-Protocol Label Switching (MPLS) networks, a P router (106), which is typically referred to as a provider core router, is a Label Switch Router (LSR) that functions as a transit router of the core network. A PE router is typically connected to one or more P routers. In the illustrative network 100 of FIG. 1, six P routers 106 ($P_1, P_2, P_3, \ldots P_6$) are shown, with each PE router 104 ($PE_1, PE_2$), connected by a physical link to core routers $P_1, P_2$ and $P_3, P_4$, respectively.

In the current state of the art, the provider edge routers 104 ($PE_1, PE_2$) utilize the internal Border Gateway Protocol (iBGP) to exchange routing information. The routing information typically includes destination addresses prefixes and associated path attributes. The routing information via iBGP is exchanged via a Route Reflector (RR) 108 in a manner well known in the art. An Interior Gateway Protocol (IGP) is then employed to resolve traffic routing within an autonomous system, here shown as the paths between the provider edge routers 104 ($PE_1, PE_2$) via the core routers 106 ($P_1, P_2, P_3, \ldots P_6$). One type of IGP is a link-state routing protocol which include the open shortest path first (OSPF) and the intermediate system-to-intermediate system (IS-IS) protocols. In link-state routing protocols, each node possesses information about the complete network topology. Each node then independently calculates the best path or next hop from it for every possible destination in the network using local information of the topology. The collection of best next hops forms the routing table for the node. Another type of IGP is a distance-vector routing protocol, which works by having each router advertise its distances from other routers and receiving similar advertisements from other routers such that each router populates its routing table. This process continues in cycles until the routing tables of each router converge to stable values.

The Link-state advertisement (LSA) is a basic communication means of the OSPF routing protocol. It advertises or communicates the router's local routing topology to all other local routers in the same OSPF area. OSPF is designed for scalability, so some LSAs are not flooded out on all peered links, but only on those that belong to the appropriate area. In this way detailed information can be kept localized, while summary information is flooded to the rest of the network. Nevertheless, as provider edge routers are added to the network, a very large amount of state information needs to be maintained.

It would therefore be desirable to provide a system and method for segmenting the IGP routing information between the provider edge and core routers. Such an arrangement reduces signaling and messaging overhead and traffic associated with the PE routers by not including the PE routers in the IGP. Thus, the number of LSAs can be reduced by an order of magnitude, thereby enabling massive scaling of IGP infrastructures. To the inventors' knowledge, no such system or method currently exists.

SUMMARY OF THE INVENTION

In accordance with a first aspect of the present invention, there is disclosed a method for routing traffic from an ingress provider edge router to an egress provider edge router that eliminates the need to share state information between the ingress provider edge router and a plurality of core routers in a core network. The ingress provider edge router and egress provider edge router are each coupled to at least two core routers among the plurality of core routers in the core network, the ingress provider edge router learning routes with a next hop equal to an IP address of the egress provider edge router through an internal border gateway protocol (iBGP). The method comprises the step of: the ingress provider edge router balancing traffic flows on uplinks between the ingress provider edge router and the at least two core routers coupled to the ingress provider edge router without knowledge of network topology in the core network.

An internal gateway protocol (IGP) runs exclusively on the core routers in the core network to disseminate routing information among the core routers, the IGP not running on the ingress provider edge router. Accordingly, the ingress provider edge router does not maintain a database of state information for the core routers in the core network.

A destination routing label for the traffic is imposed at the core routers coupled to the ingress provider edge router after receiving the traffic from the ingress provider edge router.

In the case of a VPN, a virtual routing and forwarding (VRF) label for the traffic is imposed at the ingress provider edge router.

In accordance with a second aspect of the present invention, there is disclosed a network in which traffic is routed through a core network from an ingress provider edge router to an egress provider edge router, the network eliminating the need to share state information between the ingress provider edge router and a plurality of core routers in a core network, the ingress provider edge router and egress provider edge router each coupled to at least two core routers among the plurality of core routers in the core network, the ingress provider edge router learning routes with a next hop equal to an IP address of the egress provider edge router through an internal border gateway protocol (iBGP). Specifically, the ingress provider edge router is adapted to balance traffic flows on uplinks between the ingress provider edge router and the at least two core routers coupled to the ingress provider edge router without knowledge of network topology in the core network. The core routers are adapted to run an internal gateway protocol (IGP) to disseminate routing information among the core routers, the IGP not running on the ingress provider edge router; and the core routers adapted to impose a destination routing label for the traffic at the core routers coupled to the ingress provider edge router after receiving the traffic from the ingress provider edge router.

These aspects of the invention and further advantages thereof will become apparent to those skilled in the art as the present invention is described with particular reference to the accompanying drawings.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 1:
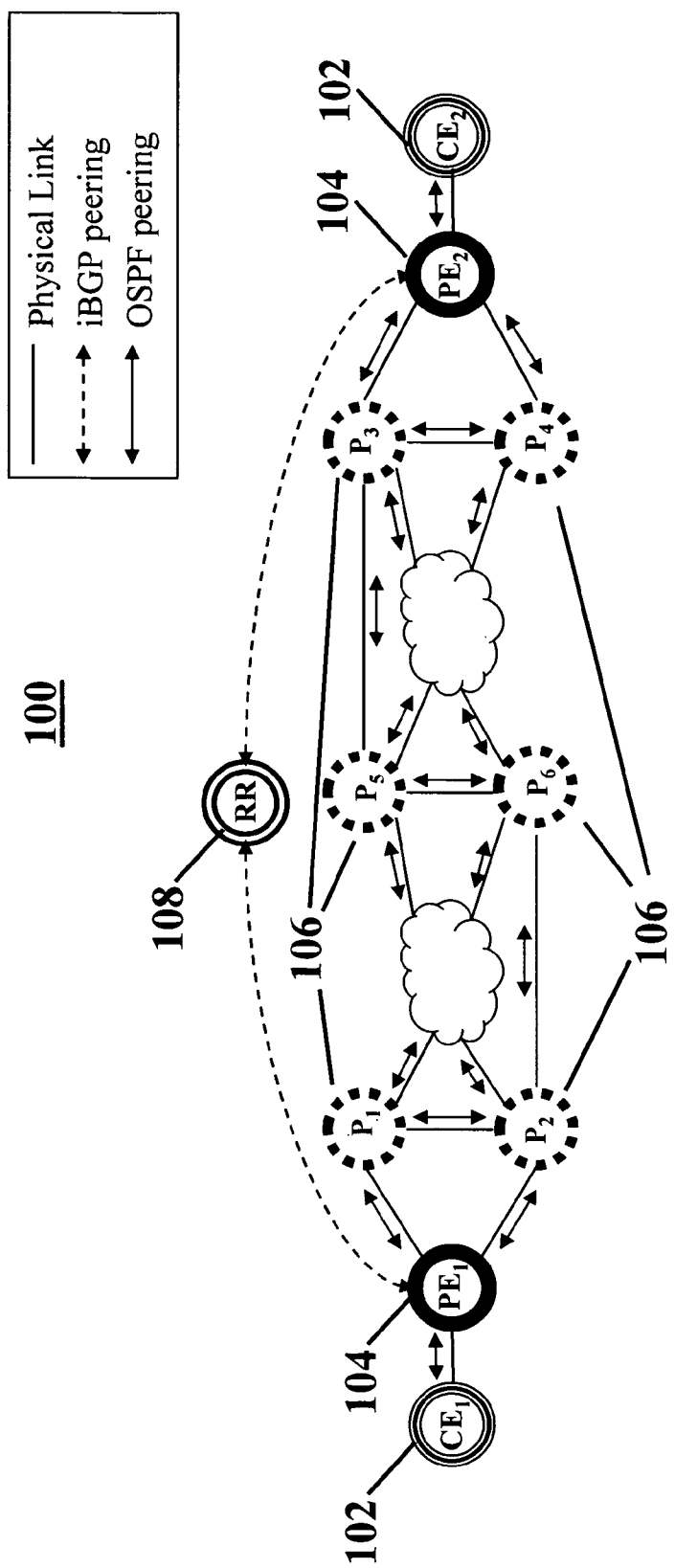
FIG. 1 is a schematic of an illustrative prior art communication network.
Figure 2:
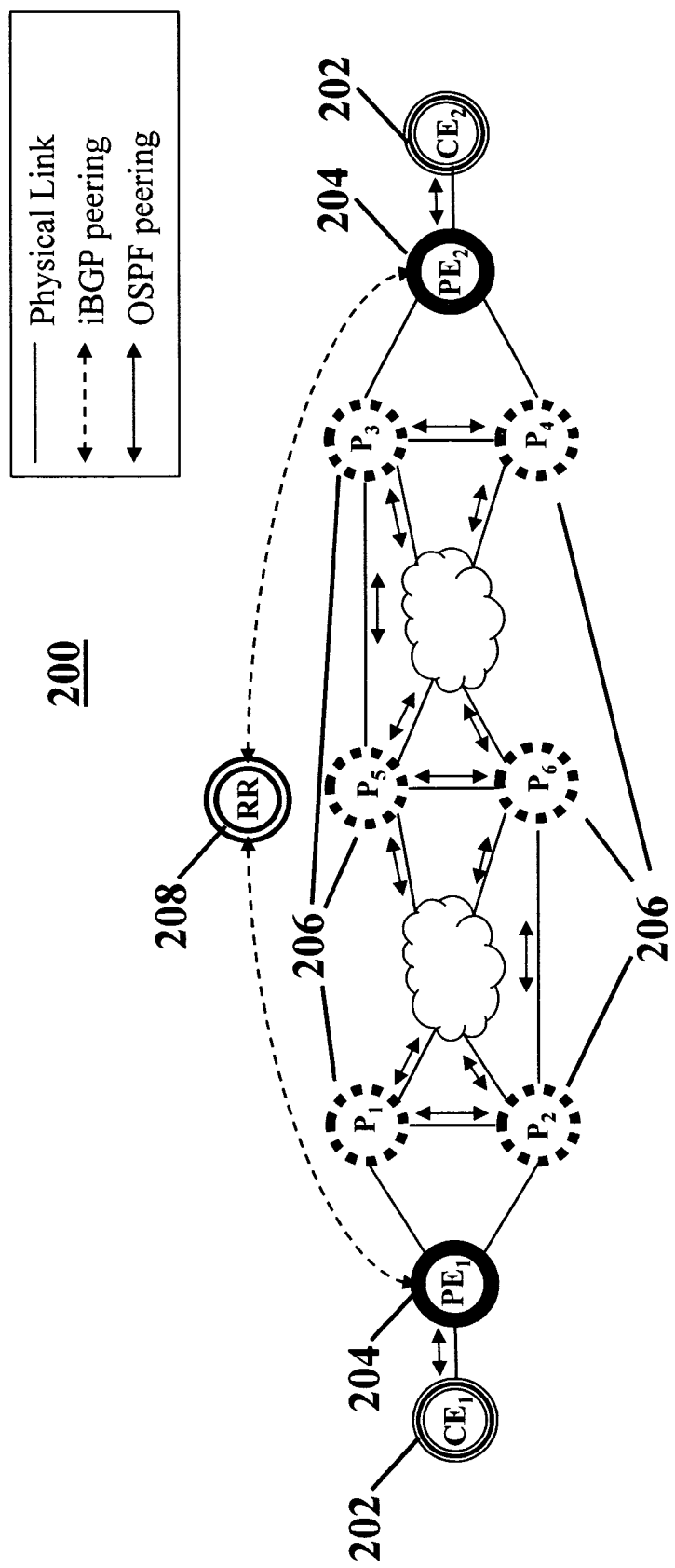
FIG. 2 is a schematic of a communication network in accordance with the present invention.

Referring now to FIG. 2, there is depicted an illustrative schematic diagram of a network 200 comprising a pair of Customer Edge (CE) routers 202 ($CE_1$, $CE_2$) coupled to a pair of Provider Edge (PE) routers 204 ($PE_1$, $PE_2$) at edges of a Multi-Protocol Label Switching (MPLS) autonomous system including a plurality of core routers (P) 206 ($P_1, P_2, P_3, \ldots P_6$). In the example shown, a VPN is depicted, which employs a VPNv4 route reflector (RR) 208 for exchanging route information between an ingress PE router and an egress PE router relative to the core via the internal Border Gateway Protocol (iBGP) as is well known in the art. The PE routers in this cooperate to establish a logical peer connection (session). iBGP is an intra-domain routing protocol that typically operates over a reliable transport protocol such as TCP to establish a TCP connection between routing peers within the autonomous system. Typically, each route between the PE routers 204 ($PE_1$, $PE_2$) that is advertised by the iBGP must have a next hop address that is reachable through an Internal Gateway Protocol (IGP) in order for such route to be considered valid. As discussed above, the IGP is a link state or distance-vector protocol. In accordance with an aspect of the present invention, the PE routers 204 ($PE_1$, $PE_2$) do not share state information with the core routers 206 ($P_1, P_2, P_3, \ldots P_6$), and are thus removed from the IGP process.

As shown in FIG. 2, the ingress PE router and egress PE router are each coupled via a physical link to at least two core routers ($P_1$, $P_2$) and ($P_3$, $P_4$) among the plurality of core routers ($P_1, P_2, P_3, \ldots P_6$) in the core network. For traffic from $CE_1$ to $CE_2$, $PE_1$ is considered to be the ingress PE and $PE_2$ is considered to be the egress PE. For traffic in the opposite direction from $CE_2$ to $CE_1$, $PE_2$ is considered to be the ingress PE and $PE_1$ is considered to be the egress PE. The inventors have discovered that it is possible to improve scalability of the entire network by removing these PE routers from the IGP process. In this regard, assuming $PE_1$ is operating as an ingress PE router, after $PE_1$ learns routes with a next hop equal to the IP address of $PE_2$ (the egress PE router in this case) through iBPG, $PE_1$ applies load balancing over the physical links to $P_1$ and $P_2$ to send incoming traffic either to either of these core router irrespective of the routing protocols utilized between routers $P_1, P_2, P_3, P_4, P_5$ and $P_6$. Thus, the routing information base (RIB) that typically holds many routes computed between the core routers need not be included in $PE_1$ and $PE_2$. This RIB for the IGP process only needs to be included in the core routers $P_1$ through $P_6$. This network topology information is exchanged between the core routers using, for example, the Open Shortest Path First (OSPF) protocol, the Intermediate-System-to-Intermediate-System (IS-IS) protocol, or the like. The OSPF protocol is described in detail in Request for Comments (RFC) 2328, entitled OSPF Version 2, April 1998, and the IS-IS protocol is described in more detail in RFC 1195, entitled Use of OSI IS-IS for Routing in TCP/IP and Dual Environments, December 1990.

In the IGP process, a sending router executing the same will generate and disseminate a Link State Advertisement (LSA) containing routing information that includes a list of all of the router's neighbors and one or more cost values associated with each neighbor. The cost value is typically an arbitrary metric that is employed to determine the relative ease or burden of communicating with the neighbor. This may include, but is not limited to, the average number of hops required, average travel time for a packet to travel, and/or amount of bandwidth available over a communications link coupling the routers. The LSAs are "advertised" among the routers so that each router in the network can construct an identical view of the network topology by aggregating the received lists of neighboring routers and associated cost values. This routing information is then input into the OSPF or IS-IS calculation to determine the lowest-cost network paths between routers.

In accordance with an aspect of the invention, there is no need to maintain a link-state database at the PE routers. Each PE router is coupled over at least a pair of known physical links to core routers $P_1$, $P_2$ and $P_3$, $P_4$. The core routers $P_1$, $P_2$, $P_3$ and $P_4$ each maintain a database of the respective PE routers that are attached to it. The ingress PE router, say $PE_1$ for traffic from $CE_1$, balances traffic flows across the physical uplinks to core routers $P_1$, $P_2$. That is, $PE_1$ streams all traffic to the same IP address ($PE_2$) over two identical cost paths to $P_1$, $P_2$. For example, $PE_1$ may stream one traffic flow over the physical link to $P_1$, while sending another traffic flow over the physical link to $P_2$.

In the context of a VPN, $PE_1$ simply applies a Virtual Route Forwarding (VRF) label at $PE_1$, without adding a destination label. The destination label is added at the ingress P router ($P_1$ or $P_2$). As is well known, the destination label is thereafter removed at the egress P router ($P_3$ or $P_4$).

Figure 3:
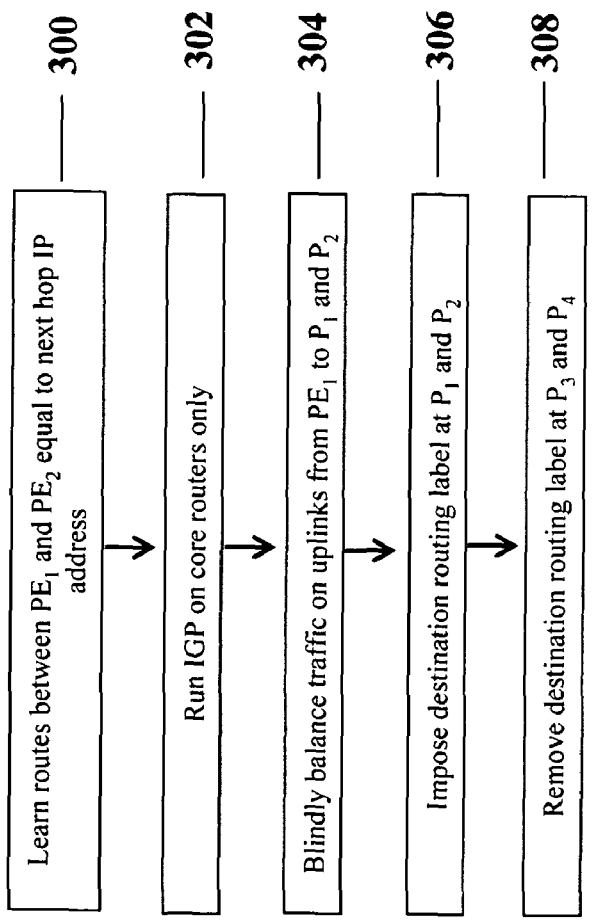
FIG. 3 is a flow chart depicting an exemplary method in accordance with the current invention.

Referring now to FIG. 3, there is shown a flowchart of an illustrative methodology in accordance with an aspect of the present invention. The method for routing traffic through a network from an ingress PE router ($PE_1$ or $PE_2$) to an egress PE edge router ($PE_1$ or $PE_2$) that eliminates the need to share state information between the ingress provider edge router ($PE_1$ or $PE_2$) and a plurality of core routers ($P_1$-$P_6$) in a core network, the ingress PE router and egress PE router each respectively coupled to at least two core routers ($P_1$, $P_2$, $P_3$ and $P_4$) among the plurality of core routers ($P_1$-$P_6$) in the core network. In step 300, the ingress provider edge router (e.g., $PE_1$) learns routes with a next hop equal to an IP address of the egress provider edge router ($PE_2$) through an internal border gateway protocol (iBGP). In step 302, the internal gateway protocol (IGP) is run exclusively on the core routers in the core network to disseminate routing information among the core routers, the IGP not running on the ingress provider edge router. In step 304, the ingress provider edge router $PE_1$ balances traffic flows on uplinks between the $PE_1$ and the at least two core routers $P_1$, $P_2$ coupled to $PE_1$ without knowledge of network topology in the core network. If the traffic is being communicated over a VPN, $PE_1$ applies a VRF label. In step 306, a destination routing label for the traffic is imposed at the core routers $P_1$, $P_2$ coupled to $PE_1$ after receiving the traffic from $PE_1$. In step 308, the destination routing label is removed at either $P_3$ or $P_4$. For traffic traveling in the reverse direction from $CE_2$, the process is simply reversed with $PE_2$ operating as the ingress provider edge router.

In summary, aspects of the present invention include a method and system to segment the IGP routing information between core routers and provider edge routers in order to allow massive scaling of IGP routing infrastructures. Through static configuration or other protocols in the P router and new logic in the PE, there is no need to include the PEs in the IGP infrastructure.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for routing traffic from an ingress provider edge router to an egress provider edge router, the method comprising:

balancing traffic flows on uplinks between the ingress provider edge router and at least two core routers coupled to the ingress provider edge router, the at least two core routers among a plurality of core routers in a core network, the balancing performed without knowledge of network topology in the core network; and assigning at the ingress provider edge router a virtual routing and forwarding (VRF) label to the traffic flows on the uplinks between the ingress provider edge router and the at least two core routers coupled to the ingress provider edge router without adding any destination labels to the traffic flows, the traffic flows forming the traffic for routing to the egress provider edge router.

2. The method of claim 1, further comprising running an internal gateway protocol (IGP) on the plurality of core routers in the core network to disseminate routing information among the plurality of core routers, the IGP not running on the ingress provider edge router.

3. The method of claim 2, wherein the ingress provider edge router does not maintain a database of state information for the plurality of core routers in the core network.

4. The method of claim 2, wherein a destination routing label for the traffic is imposed at the at least two core routers coupled to the ingress provider edge router after receiving the traffic from the ingress provider edge router.

5. The method of claim 4, wherein a destination Internet Protocol (IP) address of the egress provider edge router is associated with the traffic.

6. A method for routing traffic through a network from an ingress provider edge router to an egress provider edge router that eliminates the need to share state information between the ingress provider edge router and a plurality of core routers in a core network, the ingress provider edge router learning routes to the egress provider edge router through an internal border gateway protocol (iBGP), the method comprising:

balancing traffic flows on uplinks between the ingress provider edge router and at least two core routers coupled to the ingress provider edge router without knowledge of network topology in the core network;

assigning at the ingress provider edge router a virtual routing and forwarding (VRF) label to the traffic flows on the uplinks between the ingress provider edge router and the at least two core routers coupled to the ingress provider edge router without adding destination labels to the traffic flows, the traffic flows forming the traffic for routing to the egress provider edge router;

running an internal gateway protocol (IGP) on the plurality of core routers in the core network to disseminate routing information among the plurality of core routers, the IGP not running on the ingress provider edge router; and imposing a destination routing label for the traffic at the at least two core routers coupled to the ingress provider edge router after receiving the traffic from the ingress provider edge router.

7. The method of claim 6, further comprising associating a destination Internet Protocol (IP) address of the egress provider edge router with the traffic.

8. A network in which traffic is routed through a core network from an ingress provider edge router to an egress provider edge router, the network eliminating the need to share state information between the ingress provider edge router and a plurality of core routers in a core network, the ingress provider edge router learning routes to the egress provider edge router through an internal border gateway protocol (iBGP), the network comprising:

the ingress provider edge router to:

balance traffic flows on uplinks between the ingress provider edge router and at least two core routers coupled to the ingress provider edge router without knowledge of network topology in the core network; and assign a virtual routing and forwarding (VRF) label to the traffic flows on the uplinks between the ingress provider edge router and the at least two core routers coupled to the ingress provider edge router without adding destination labels to the traffic flows; and the plurality of core routers to:

run an internal gateway protocol (IGP) to disseminate routing information among the plurality of core routers, the IGP not running on the ingress provider edge router; and impose a destination routing label for the traffic at the at least two core routers coupled to the ingress provider edge router after receiving the traffic from the ingress provider edge router.

9. A network comprising:

a plurality of core routers in a core network;

an egress provider edge router communicatively coupled to the core network; and an ingress provider edge router communicatively coupled to at least two core routers among the plurality of core routers to send traffic to the egress provider edge router, the ingress provider edge router to:

balance traffic flows on uplinks between the ingress provider edge router and the at least two core routers coupled to the ingress provider edge router without knowledge of network topology in the core network; and assign a virtual routing and forwarding (VRF) label to the traffic flows on the uplinks between the ingress provider edge router and the at least two core routers coupled to the ingress provider edge router without adding any destination labels to the traffic flows.

10. The network of claim 9, wherein the plurality of core routers in the core network are to run an internal gateway protocol (IGP) to disseminate routing information among the core routers, the IGP not running on the ingress provider edge router.

11. The network of claim 10, wherein the ingress provider edge router does not maintain a database of state information for the plurality of core routers in the core network.

12. The network of claim 10, wherein the at least two core routers coupled to the ingress provider edge router are to impose a destination routing label for the traffic after receiving the traffic from the ingress provider edge router.

13. The network of claim 12, wherein the ingress provider edge router is to associate a destination Internet Protocol (IP) address of the egress provider edge router with the traffic.

* * * * *